US012594858B2

(12) United States Patent
César

(10) Patent No.: US 12,594,858 B2
(45) Date of Patent: Apr. 7, 2026

(54) ELECTRIC VEHICLE BATTERY SYSTEM CONTROL STRATEGY INCORPORATING THERMAL MANAGEMENT

(71) Applicant: Volvo Car Corporation, Gothenburg (SE)

(72) Inventor: Rui César, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 153 days.

(21) Appl. No.: 18/463,474

(22) Filed: Sep. 8, 2023

(65) Prior Publication Data

US 2025/0083568 A1 Mar. 13, 2025

(51) Int. Cl.
| *B60L 58/25* | (2019.01) |
| *B60L 3/00* | (2019.01) |
| *B60L 58/12* | (2019.01) |
| *B60L 58/16* | (2019.01) |
| *B60L 58/26* | (2019.01) |
| *B60L 58/27* | (2019.01) |

(Continued)

(52) U.S. Cl.
CPC .............. *B60L 58/25* (2019.02); *B60L 3/0046* (2013.01); *B60L 58/12* (2019.02); *B60L 58/16* (2019.02); *B60L 58/26* (2019.02); *B60L 58/27* (2019.02); *H01M 10/4257* (2013.01); *H02J 7/0063* (2013.01); *H01M 2010/4278* (2013.01); *H01M 2220/20* (2013.01)

(58) Field of Classification Search
CPC ............................ B60L 58/10; B60L 58/24–27
See application file for complete search history.

(56) References Cited

U.S. PATENT DOCUMENTS

| 2008/0280192 A1* | 11/2008 | Drozdz | ................. | B60L 3/0046 |
| | | | | 700/297 |
| 2011/0318616 A1* | 12/2011 | Kim | ...................... | H02J 7/0014 |
| | | | | 429/62 |

(Continued)

FOREIGN PATENT DOCUMENTS

| CN | 110329110 A | 10/2019 |

OTHER PUBLICATIONS

Extended European Search Report received for European Patent Application Serial No. 24199225.4 dated Feb. 12, 2025, 15 pages.

*Primary Examiner* — Aaron L Troost

(74) *Attorney, Agent, or Firm* — Amin, Turocy & Watson, LLP

(57) ABSTRACT

Control strategies for an electric vehicle battery system that incorporate thermal management are described. In an example, a method comprises employing, by a system operatively coupled to at least one processor, a smartcell battery system to supply power to one or more electrical systems of an electric vehicle, the smart cell battery system comprising a plurality of battery cell units respectively comprising local controllers that control operations of respective battery cells connected to the local controllers. The method further comprises determining, by the system, control information for each of the battery cell units that results in balancing bringing the respective battery cells within a target thermal window and satisfying power demands of the one or more electrical systems, and directing, by the system, the local controllers to control the operations of the respective battery cells in accordance with the control information.

20 Claims, 9 Drawing Sheets

(51) Int. Cl.
    *H01M 10/42*     (2006.01)
    *H02J 7/00*     (2006.01)

(56)            References Cited

U.S. PATENT DOCUMENTS

2022/0190619 A1    6/2022   Fasching et al.
2022/0368135 A1*  11/2022  Nguyen ................. B60L 58/10

* cited by examiner

700

EMPLOYING, BY A SYSTEM OPERATIVELY COUPLED TO AT LEAST ONE PROCESSOR, A SMARTCELL BATTERY SYSTEM TO SUPPLY POWER TO ONE OR MORE ELECTRICAL SYSTEMS OF AN ELECTRIC VEHICLE, THE SMART CELL BATTERY SYSTEM COMPRISING A PLURALITY OF BATTERY CELL UNITS RESPECTIVELY COMPRISING LOCAL CONTROLLERS THAT CONTROL OPERATIONS OF RESPECTIVE BATTERY CELLS CONNECTED TO THE LOCAL CONTROLLERS

702

DETERMINING, BY THE SYSTEM, CONTROL INFORMATION FOR EACH OF THE BATTERY CELL UNITS THAT RESULTS IN BALANCING BRINGING THE RESPECTIVE BATTERY CELLS WITHIN A TARGET THERMAL WINDOW AND SATISFYING POWER DEMANDS OF THE ONE OR MORE ELECTRICAL SYSTEMS

704

DIRECTING, BY THE SYSTEM, THE LOCAL CONTROLLERS TO CONTROL THE OPERATIONS OF THE RESPECTIVE BATTERY CELLS IN ACCORDANCE WITH THE CONTROL INFORMATION

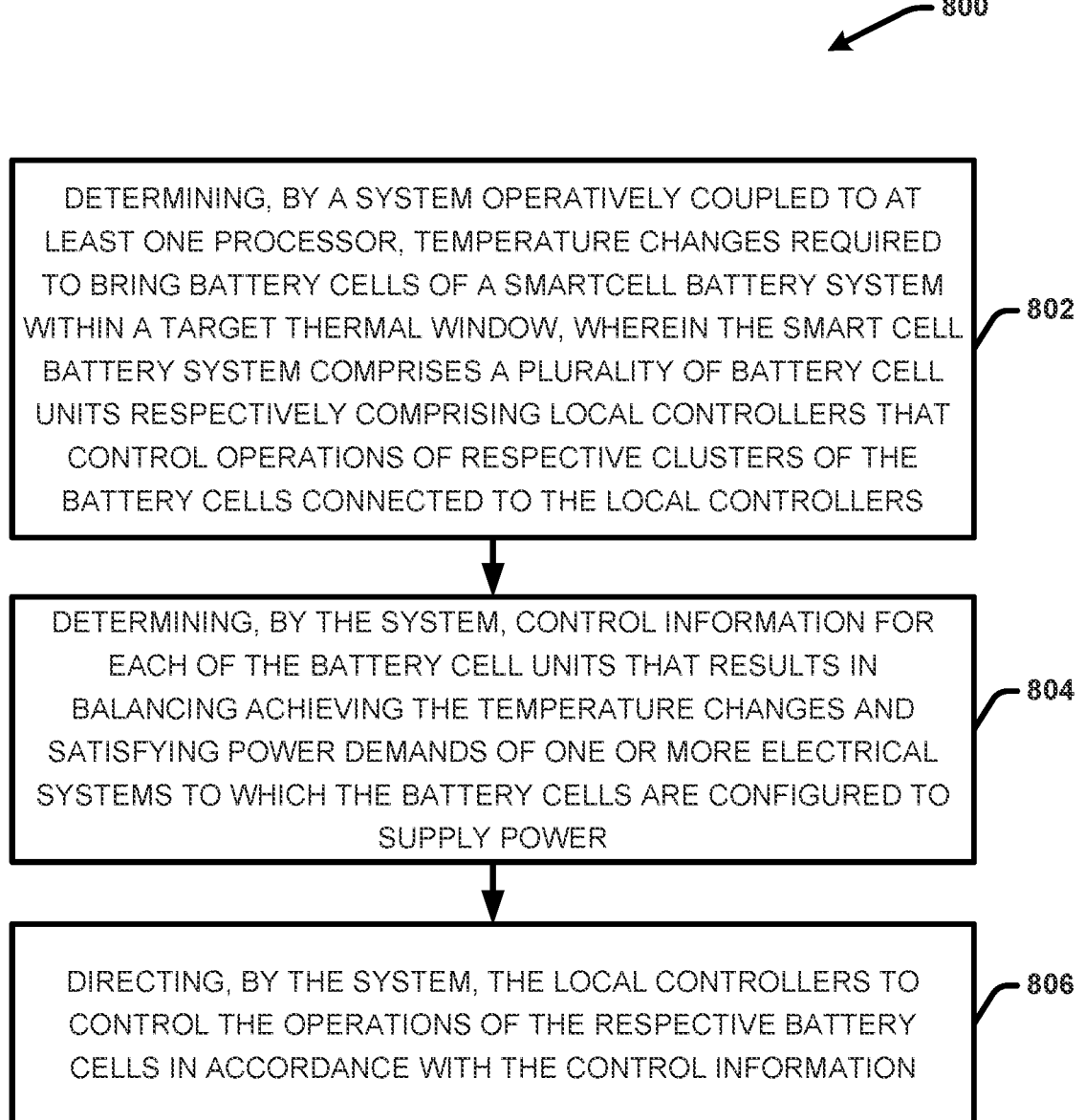

DETERMINING, BY A SYSTEM OPERATIVELY COUPLED TO AT LEAST ONE PROCESSOR, TEMPERATURE CHANGES REQUIRED TO BRING BATTERY CELLS OF A SMARTCELL BATTERY SYSTEM WITHIN A TARGET THERMAL WINDOW, WHEREIN THE SMART CELL BATTERY SYSTEM COMPRISES A PLURALITY OF BATTERY CELL UNITS RESPECTIVELY COMPRISING LOCAL CONTROLLERS THAT CONTROL OPERATIONS OF RESPECTIVE CLUSTERS OF THE BATTERY CELLS CONNECTED TO THE LOCAL CONTROLLERS

DETERMINING, BY THE SYSTEM, CONTROL INFORMATION FOR EACH OF THE BATTERY CELL UNITS THAT RESULTS IN BALANCING ACHIEVING THE TEMPERATURE CHANGES AND SATISFYING POWER DEMANDS OF ONE OR MORE ELECTRICAL SYSTEMS TO WHICH THE BATTERY CELLS ARE CONFIGURED TO SUPPLY POWER

DIRECTING, BY THE SYSTEM, THE LOCAL CONTROLLERS TO CONTROL THE OPERATIONS OF THE RESPECTIVE BATTERY CELLS IN ACCORDANCE WITH THE CONTROL INFORMATION

FIG. 8

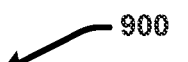

REPORTING, BY LOCAL CONTROLLERS OF RESPECTIVE BATTERY CELL UNITS OF A SMART CELL BATTERY SYSTEM, BATTERY CELL UNIT PARAMETER INFORMATION TO A MASTER CONTROLLER OF THE SMART CELL BATTERY SYSTEM, THE LOCAL CONTROLLERS AND THE MASTER CONTROLLER RESPECTIVELY COUPLED TO PROCESSORS, THE BATTERY CELL UNIT PARAMETERS COMPRISING TEMPERATURES OF RESPECTIVE BATTERY CELLS CONNECTED TO THE LOCAL CONTROLLERS          902

RECEIVING, BY THE LOCAL CONTROLLERS FROM THE MASTER CONTROLLER, CONTROL INFORMATION, DETERMINED BY THE MASTER CONTROLLER BASED ON THE BATTERY CELL UNIT PARAMETER INFORMATION, THAT RESULTS IN BALANCING BRINGING THE RESPECTIVE BATTERY CELLS WITHIN A TARGET THERMAL WINDOW AND SATISFYING POWER DEMANDS OF THE ONE OR MORE ELECTRICAL SYSTEMS          904

CONTROLLING, BY THE LOCAL CONTROLLERS, OPERATIONS OF THE RESPECTIVE BATTERY CELLS IN ACCORDANCE WITH THE CONTROL INFORMATION          906

FIG. 9

ELECTRIC VEHICLE BATTERY SYSTEM CONTROL STRATEGY INCORPORATING THERMAL MANAGEMENT

TECHNICAL FIELD

The subject disclosure relates to electric and/or hybrid electric vehicle drive technologies, and more particularly to control strategies for an electric vehicle battery system that incorporate thermal management.

BACKGROUND

Electric vehicles (EVs) are becoming increasingly popular as a more sustainable mode of transportation. Currently, an electric driveline (e.g., an electric driveline used in an electric vehicle) is based on a battery arrangement with a direct current (DC) voltage of approximately 370 volts (V). Many systems are designed around this battery arrangement to protect and control the battery cells. Auxiliary units are used to generate alternating current (AC) voltage to run motors and charge the battery cells. Such systems are often complex and expensive and can be a source of errors.

It is known from practical experience that electric drive technology is limited, for example, by the battery arrangements available today. This concerns, for example, limitations given by the complex requirements, e.g., a large number of charging cycles, performance requirements in terms of electrical power output, available capacity, operating conditions, etc. For example, controlling a battery arrangement sets high requirements if an electric machine (e.g., an electric motor) is to be operated with it.

In addition, lithium-ion battery cells used in today's commercial electric vehicles are sensitive to temperature, which impacts performance of the battery pack including range, voltage efficiency, charge time, as well as the state of health (SOH) the battery pack. For example, cold battery pack temperatures can reduce the charge/discharge capacity and power capabilities of the battery pack, as the chemical reaction inside the battery slows down, raising the internal resistance. In extreme cold (typically below 0° C.), battery cells may even stop functioning and endure irreversible damage.

Higher battery pack temperatures can also result in performance degradation including loss of capacity (e.g., owing to loss of lithium and the reduction of active materials under high temperatures), and loss of power (e.g., owing to an increase in internal resistance). Similar to extreme cold, extreme high temperatures (typically above 60° C.) can also result in the battery pack not functioning, and in some cases, results in irreversible damage. In the worst case, a thermal runaway can even trigger self-ignition and explosion.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate control strategies for an electric vehicle battery system that incorporate thermal management. management of electric vehicle battery systems.

In an embodiment, a method can comprise employing, by a system operatively coupled to at least one processor, a smartcell battery system to supply power to one or more electrical systems of an electric vehicle, the smart cell battery system comprising a plurality of battery cell units respectively comprising local controllers that control operations of respective battery cells connected to the local controllers. The method further comprises determining, by the system, control information for each of the battery cell units that results in balancing bringing the respective battery cells within a target thermal window and satisfying power demands of the one or more electrical systems, and directing, by the system, the local controllers to control the operations of the respective battery cells in accordance with the control information.

In various implementations, the method further comprises determining, by the system, temperature changes required to bring the respective battery cells within the thermal target window and wherein determining the control information comprises determining the control information based on the temperature changes.

In some implementations, the control information comprises usage priority information that controls a priority order of usage of the respective battery cells to supply the power to the one or more electrical systems. In various embodiments, the priority order prioritizes using cooler battery cells before using warmer battery cells. The priority order can further result in increasing or decreasing temperatures of different battery cells of the respective battery cells. For example, the operations comprise can comprise operating the respective battery cells in different operating modes, wherein the control information controls timing and duration of operating the respective battery cells in the different operating modes, and wherein the different operating modes result in increasing or decreasing temperatures of the respective battery cells.

In another embodiment, a system can comprise a smartcell battery system configured to supply power to one or more electrical systems of an electric vehicle, the smart cell battery system comprising a plurality of battery cell units respectively comprising local controllers that control operations of respective battery cells connected to the local controllers. The system can further comprise a memory that stores computer-executable components, and a processor that executes the computer-executable components stored in the memory. The computer-executable components can comprise a scheduling component that determines control information for each of the battery cell units that results in balancing bringing the respective battery cells within a target thermal window and satisfying power demands of the one or more electrical systems, and a control component that directs the local controllers to control the operations of the respective battery cells in accordance with the control information.

In another embodiment, a computer program product that facilitates controlling power supplied to one or more electrical systems of an electric vehicle from a smartcell battery system comprising a plurality of battery cell units respectively comprising local controllers that control operations of respective battery cells connected to the local controllers. The computer program product comprising executable instructions that, when executed by a processor, facilitate performance of operations, comprising determining control information for each of the battery cell units that results in balancing bringing the respective battery cells within a target thermal window and satisfying power demands of the one or more electrical systems, and directing the local controllers to control the operations of the respective battery cells in accordance with the control information.

DESCRIPTION OF THE DRAWINGS

One or more exemplary embodiments are described below in the Detailed Description section with reference to the following drawings.

FIG. 7 illustrates an example, computer-implemented method for controlling usage of battery cells of a smartcell battery system based on thermal considerations, in accordance with one or more embodiments described herein.

FIG. 8 illustrates another example, computer-implemented method for controlling usage of battery cells of a smartcell battery system based on thermal considerations, in accordance with one or more embodiments described herein.

FIG. 9 illustrates another example, computer-implemented method for controlling usage of battery cells of a smartcell battery system based on thermal considerations, in accordance with one or more embodiments described herein.

DETAILED DESCRIPTION

Figure 1:
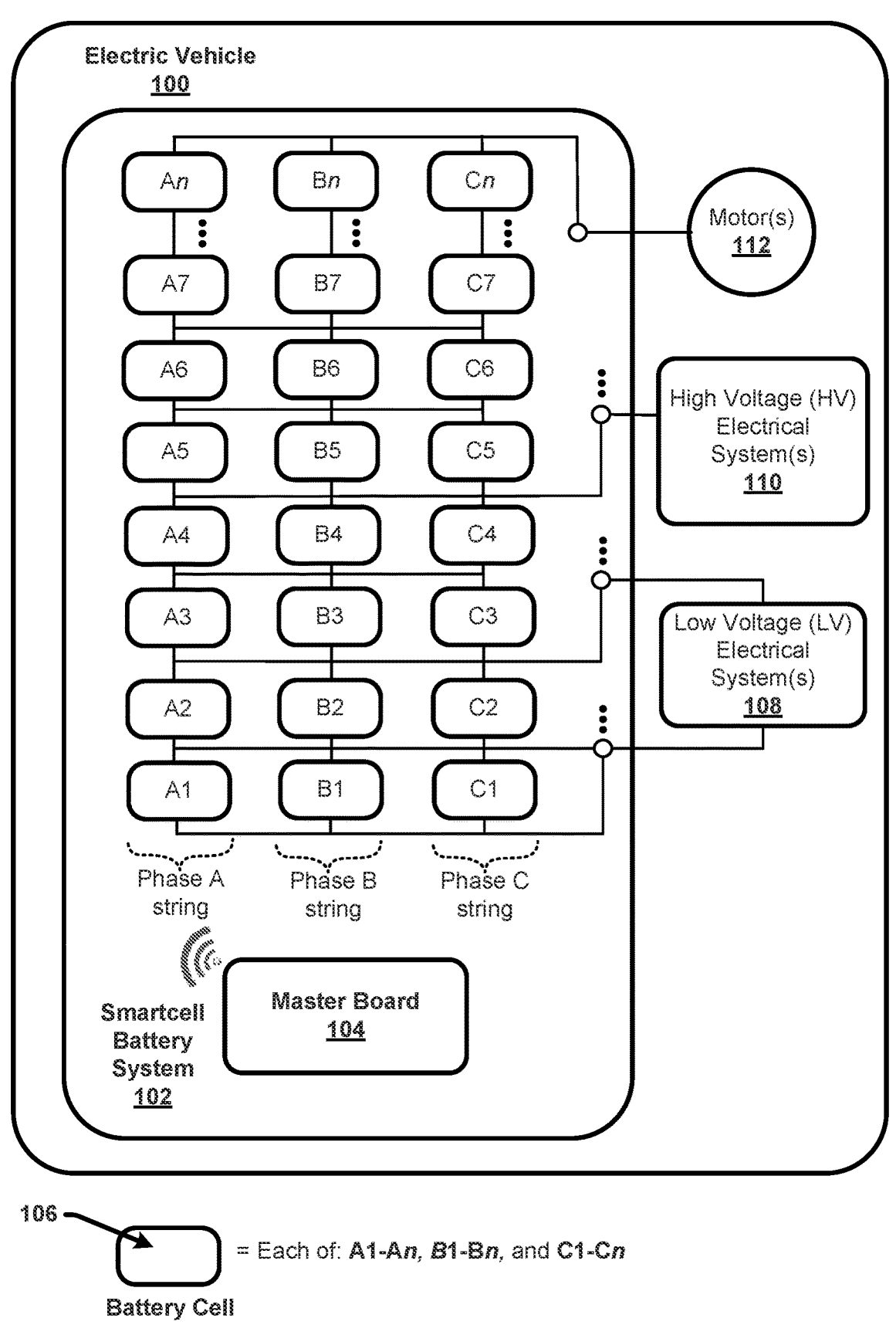
FIG. 1 illustrates an example smartcell battery system that supplies power to one or more electrical systems of an electric vehicle in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

In one or more embodiments described herein, systems, computer-implemented methods, and/or computer program products that provide one or more embodiments described herein, systems, computer-implemented methods, and/or computer program products that facilitate control strategies for an electric vehicle battery system that incorporate thermal management. The disclosed control strategies are particularly directed to techniques for controlling usage (e.g., with respect to priority and duration) of battery cells of an electric vehicle in a manner that optimizes efficiency while minimizing degradation based on thermal sensitivities of the battery cells. More particularly, the disclosed techniques incorporate thermal management of the battery system using intelligent scheduling logic as opposed to using external heating and/or cooling apparatuses. To this end, the disclosed techniques are rooted in the battery system of the electrical vehicle being a smartcell battery system.

A smartcell battery system aims to remove large and costly parts from a conventional drivetrain and use the batteries more efficiently. More particularly, a smartcell battery system is a multilevel inverter concept that aims to replace driveline components such as the conventional large inverter by integrating them into printed circuit boards (PCBs) connected to clusters of battery cells. These PCBs are connected wirelessly to a central controller that handles high level control. Each of the PCBs include local wireless communication hardware, a small direct-to-direct (DCDC) converter, a plurality of power switches (e.g., high current and low voltage switches), one or more sensors, and other electronic elements hardware and software elements that enable them intelligently control and manage operations of the respective battery cells to which they are connected (e.g., rendering them "smart"). Further the PCBs enable the direct current (DC) output from a small battery cluster to be converted into an alternating current (AC) to control an electric motor through field-oriented control (FOC). The battery pack can be configured in a number of different ways depending on need for propulsion, utilization by other high and low voltage electrical systems of the vehicle and charging. Through changing the inverter switching to a smartcell system, the battery back can operate at double the voltage level of similar battery packs using a conventional inverter, resulting in a lower current with less losses. Further only the battery cells needed are activated instead of all batteries needing to be constantly active, thereby increasing efficiency.

At a high level, the disclosed control strategy for the smartcell battery system selectively uses (e.g., turns on and off) the power supplied by respective battery cells as needed based on the dynamic power demands of the electrical systems to which they feed and monitored temperatures of the respective battery cells, among other factors. In accordance with various embodiments, the disclosed techniques increase and decrease battery cell usage priority such that each cell or cluster of cells can be warmed up or cooled without requiring any battery heating and cooling system actuation. This implies energy savings due to no actuation required from an external heating and cooling system to control maximum and/or minimum cell temperatures. In this regard, the traditional thermal control for battery packs requires energy to activate multiple actuators involved in cell cooling and heating events. In some embodiments in which an external cooling and heating system is incorporated into the smartcell battery system, the disclosed techniques also facilitate reducing energy consumption from the external thermal control system by delaying the need for activation thereof. Implicitly this functionality also manages the delta temperature within the battery pack cells, which for control purposes should be kept to a minimum value (e.g., ideal for cell ageing control and overall pack performance).

Furthermore, the battery cell usage scheduling logic will incorporate functionality to not use cells or cell clusters that are diagnosed faulty or unsafe. This can be based on temperature sensor electrical or rationality faults, voltage sensors faults, resistance measurements, current measurement faults, cell pressure measurements, contactor faults, communication faults or any other cluster control input faults.

While one or more devices and/or systems are described below with reference to a wheeled vehicle, such as an automobile, the one or more embodiments described herein are not limited to this use. A battery device and/or battery system described herein can be implemented in any suitable electronic system such as, for instance, an electric driveline of an electric vehicle (EV). Indeed, the one or more devices and/or systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable mobile and/or stationary device having use of a battery device or battery system.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

FIG. 1 illustrates an example smartcell battery system 102 that supplies power to one or more electrical systems of an electric vehicle 100 in accordance with one or more embodiments described herein. The one or more electrical systems can include one or more motors 112, one or more high voltage (HV) electrical systems 110 and/or one or more low voltage (LV) electrical systems 108. The one or more LV electrical systems 110 can include any type of electrical system associated with the electric vehicle 100 that typically consumes a DC input voltage less than about 50 volts (V) (e.g., 12V, 14V, 15V, 40V, 48V, etc.). Some examples of the LV electrical systems can include, but are not limited to, a power steering system, an autonomous driving system, an infotainment system, a navigation system, a backup camera system, and the like. The one or more HV electrical systems 110 can include any type of electrical system associated with the electric vehicle 100 that typically consumes a DC input voltage greater than about 50 V (e.g., 48V. 72V. 100 V, 400V, etc.), such as the heating, ventilation and air conditioning (HVAC) system, and others.

The one or more motors 112 (e.g., typically a single motor for a 2-wheel drive vehicle and two motors for a 4-wheel drive vehicle) can include any type of electric vehicle motor that is part the vehicle's powertrain or drive, including one or more DC motors and/or one or more AS motors. In various embodiments, the one or more motors 112 can include or correspond to a three-phase electric motor such as a permanent magnetic synchronous motor (PMSM). A PMSM is a synchronous machine that uses permanent magnets (PM) to generate a magnetic field instead of electromagnetic windings. The three-phase machine operates using a three-phase current system. The fundamental frequency of the supplying three-phase system also decides the rotor speed by controlling the rotating magneto-motive force (MMF). Together with the field of the PM rotor, the MMF generates the torque.

The rotor consists of the PM and three static coils are the stator windings. The stator windings are distributed 120° apart from the PM in the center. The stator windings can be represented as an inductance in series with a resistance. The three windings are described as phase A, phase B, and phase C with the phase currents ia, ib and ic. When the current runs through the static coils a magnetic field is generated according to Faraday's law, and a magnetic field is generated by the PM. When the electrical angle between the MMF of the stator and the rotor field is 90°, the maximum torque is generated.

In conventional BEV systems, the three-phase current used for an AC motor such as PMSM is generated from a DC power supply by an inverter. In accordance with one or more embodiments of the disclosed techniques, the three-phase current is generated from the smartcell battery system 102 without the use of an inverter. To facilitate this end, the smartcell battery system 102 comprises a plurality of battery cells (not shown) arranged in three separate strings respectively corresponding to three different phases (e.g., Phase A string, Phase B string and Phase C string) that can provide the respective three phase currents of a three-phrase current used to drive the one or more motors 112.

In this regard, the smartcell battery system 102 includes a plurality of battery cell units 106 arranged in three separate strings respectively indicated as Phase A string, Phase B string and Phase C string. The battery cell units 106 associated with the Phase A string include units A1-An, the battery cell units associated with the Phase B string include units B1-Bn, and the battery cell units associated with the Phase C string include units C1-Cn. The number of battery cell units "n" associated with each string can vary. For example, in some implementations, the number of battery cell units n included in each string is 96, making a total of 288 battery cell units 106 in the smartcell battery system 102. However, the number of battery cell units 106 included in the smartcell battery system 102 are not limited to this configuration and can be tailored to suit various usage scenarios.

Each battery cell unit 106 A1-An, B1-Bn, and C1-Cn, can include one or more battery cells and a PCB device (referred to herein as a "cluster board") that includes several power electronic elements that enable them to intelligently control and manage operations of the respective battery cells to which they are connected. Further the cluster boards enable the DC output from a from respective battery cells to which they are connected to be converted into an AC to control one or more electric motors 112 through field-oriented control FOC. These cluster boards are connected wirelessly to a master board 104 that handles high level control.

Figures 2A, 2B:
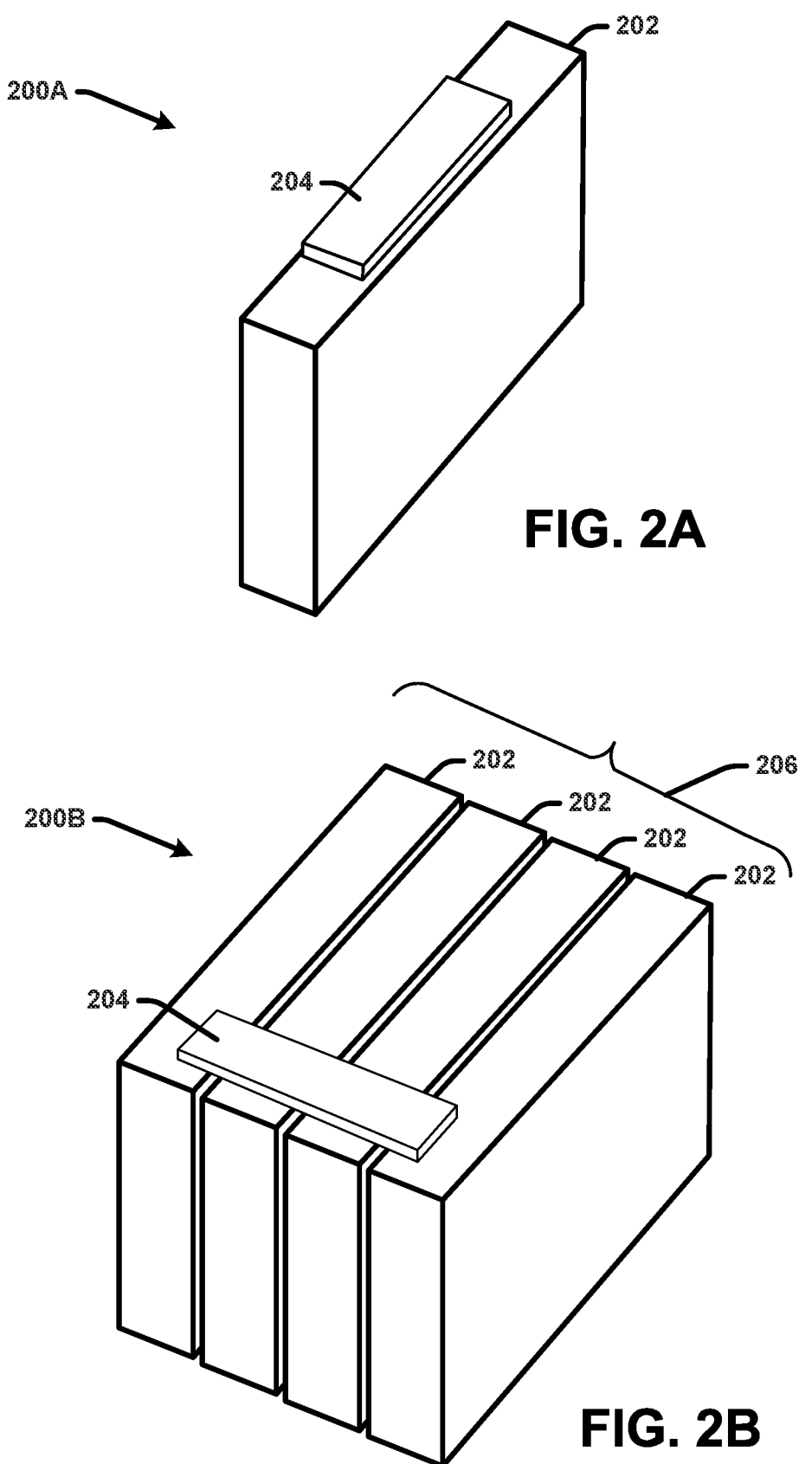
FIG. 2A illustrates an example battery cell unit of a smartcell battery system in accordance with one or more embodiments described herein.
FIG. 2B illustrates another example battery cell unit of a smartcell battery system, unit in accordance with one or more embodiments described herein.

FIGS. 2A and 2B illustrate example battery cell units of the smartcell battery system 102 in accordance with one or more embodiments described herein. FIG. 2A illustrates an example battery cell unit 200A comprising a single battery cell 202. FIG. 2B illustrates another example battery cell unit 200B comprising a plurality of battery cells 202. With reference to FIGS. 1, 2A and 2B, in various embodiments, all or some of the battery cell units 106 A1-An, B1-Bn, and C1-Cn shown in FIG. 1 can correspond to battery cell unit 200A and/or battery cell unit 200B.

As shown in FIG. 2A in some embodiments, one or more of the battery cell units 106 A1-An, B1-Bn, and C1-Cn can comprise a single battery cell 202. In other embodiments, one or more of the battery cell units 106 A1-An, B1-Bn, and C1-Cn can comprise a cluster 206 of battery cells 202, wherein the cluster 206 can comprise two or more battery cells 202. The number of battery cells 202 included in a cluster 206 can vary. For example, although battery cell unit 200B is illustrated with four battery cells 202, it should be appreciated that the number of battery cells 202 can be tailored for different usage scenarios and power demands. The battery cells 202 can respectively comprise any type of battery cell material such as, for instance, a lithium battery cell material, a lithium ion (Li-Ion) battery cell material, a lithium metal battery cell material, a lithium sulphur (Li—S) battery cell material, a molten salt (Na-NiCl2) battery cell material, a nickel metal hydride (Ni-MH) battery cell material, a lead acid battery cell.

All or some of the battery cell units 106 A1-An, B1-Bn, and C1-Cn can include a cluster board 204 formed thereon and electrically connected to one or more the battery cells 202 respectively associated with the battery cell units 106. For example, the cluster board 204 can be physically attached to a single battery cell 202 or one or more of the respective battery cells 202 included a cluster 206. The manner in which the cluster board is physically attached to a single battery cell 202 (e.g., as exemplified with respect to battery cell unit 200A) and/or a cluster 206 of battery cells (e.g., as exemplified with respect to battery cell unit 200B) can vary. For example, the cluster board 204 may be materially bonded to one or more battery cells 202, such as via one or more welded bonds (e.g., solder material welded bonds, laser material welded bonds, etc.) and/or via one or more adhesive material bonds). Alternatively, the cluster board device 204 may be attached to one or more battery cells 202 via one or more screw connections.

The manner in which the cluster board 204 (or components thereof) is electrically connected to a single battery cell 202 and/or cluster 206 of battery cells 202 can also vary. For example, each of the battery cells 202 can comprise one or more terminals or power points (not shown) and the cluster board 204 (or components thereof) can be electrically connected to at least one terminal of the battery cells 202 via any suitable thermal connections (e.g., busbars, direct metal-to-metal component connections, wired connections, etc.). In some embodiments, each of the battery cells 202 can comprise four terminals or output points, wherein two of these may be AC terminals or power points and two may be isolated DC terminals or power points. In some embodiments as applied to a cluster 206 of battery cells 202, the cluster board 204 (or components thereof) may be electrically connected to at least one terminal of each battery cell of the cluster 206. In other embodiments as applied to a cluster 206 of battery cells 202, the PCB device 204 (or components thereof) may be electrically connected to at least one terminal of at least one battery cell 202 of the cluster 206.

The battery cell units 106 A1-An, B1-Bn, and C1-Cn (and/or components thereof) can be electrically connected to one another (e.g., via hardwire connections) in series and/or in parallel in a suitable number to reach a desired voltage and/or to form independent subgroups of the battery cell units 106 connected to different electrical systems (e.g., one or more of the LV electrical systems 108 and/or the HV electrical systems 110) of the electric vehicle 100. The battery cell units 106 (and/or components thereof), and or subgroups of the battery cell units 106, can further be connected electrically (e.g., via hardwire connections) to one or more motors 112, one or more of the LV electrical systems 108 and/or the HV electrical systems 110.

For example, in various embodiments, some or all of the battery cell units 106, A1-n, B1-n, and C1-n (or portions thereof as applied two electric motors in a 4-wheel drive machine) can be used to feed a DC electrical current to one or more LV electrical systems 108 and/or one or more HV electrical systems 110 as well as to feed AC electrical current to the one or more motors 112. To facilitate this end, the respective cluster boards 204 of the battery cell units 106 can include a DCDC converter that can be used to generate a desired DC output voltage for feeding the LV and/or HV electrical systems. The DCDC converters of the respective battery cell units 106 can be connected in series and/or in parallel (e.g., via wired connections). The respective cluster boards 204 can also include an H-bridge and each of the H-bridges can be connected in series (via wired connections). The battery cell units 106 can feed the respective AC phase currents from (each of the three phase strings A, B and C) to the one or more motors 112 via their respective battery cell clusters and H-bridge connections independent from their respective DCDC converters which feed the DC current to the corresponding LV electrical systems 110 or HV electrical systems 112 to which they are connected. Various configurations are envisioned.

In this regard, the cluster board 204 can include or correspond to a circuit board device that comprises electronic or electrical hardware (and software) components that enable the cluster board 204 to intelligently control various operations of the respective battery cells 202 connected thereto, including supplying DC output and AC output to the corresponding electrical systems of the electric vehicle 100. The electronic or electrical hardware components can include, but are not limited to: a DCDC converter, a power module comprising a number of power switches used for the DCDC converter and the H-bridge (among other functions), busbars, wires, ports, one or more sensors, one or more control units (e.g., comprising a microprocessor, a central processing unit (CPU) coupled to memory device, or the like), a wireless communication component (e.g., a radio frequency (RF) transmitter/receiver, transceiver, or the like), and various others.

As noted above, the cluster boards 204 of each of the battery cell units 106 A1-n. B1-n, and C1-n can be connected wirelessly (e.g., via any suitable wireless communication technology) to a master board 104 that handles high level control. In this regard, the master board 104 can and the battery cell units 106 A1-n, B1-n, and C1-n can be configured to operate in accordance with a server-client architecture, wherein the master board 104 communicates (i.e., broadcasts, transmits, sends, etc.) control information to the respective battery cell units 106, and wherein the battery cell units 106 are configured to control operations of the respective battery cell units 106 in accordance with the received control information.

Figure 3:
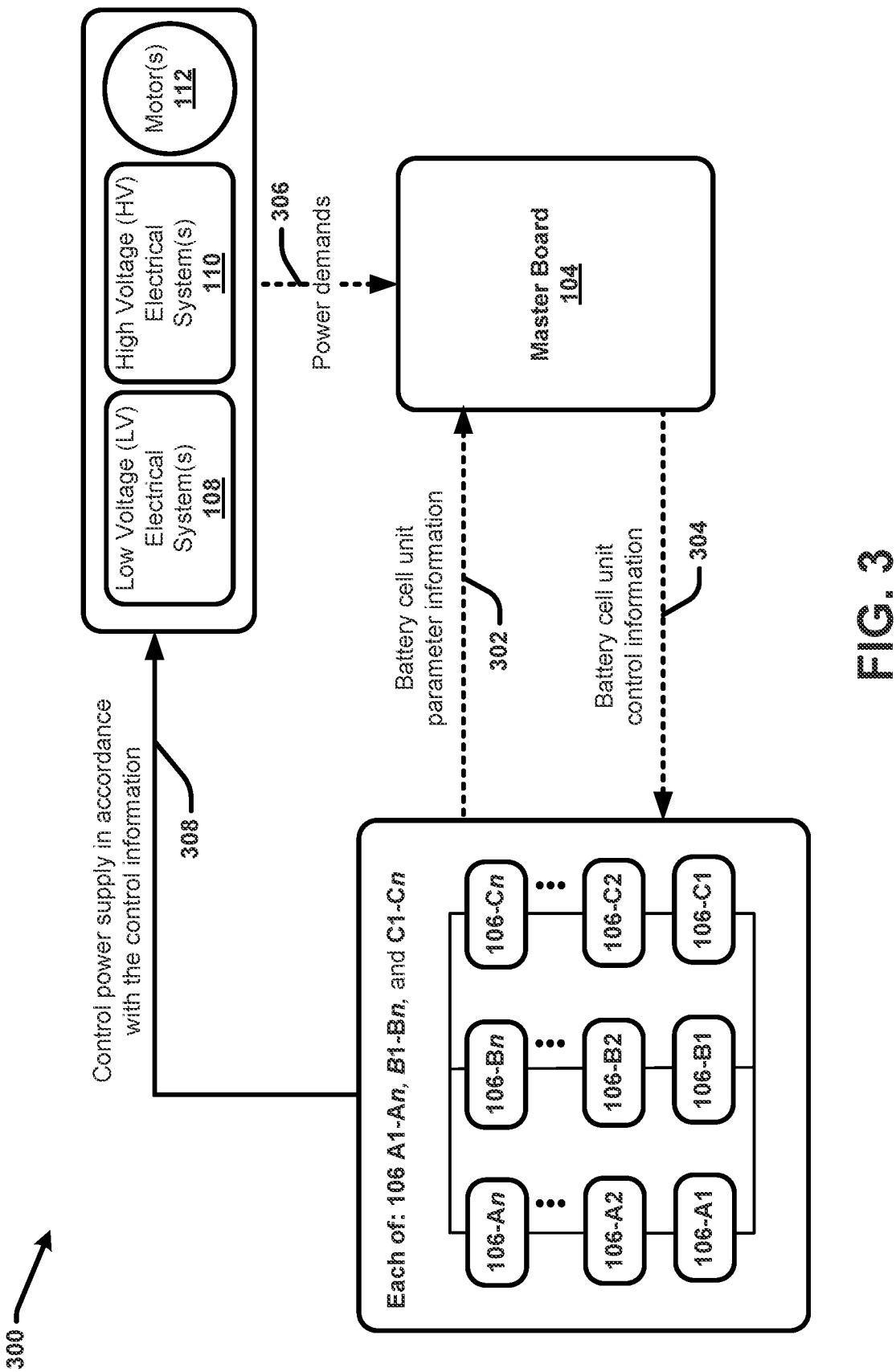
FIG. 3 illustrates a high-level flow diagram of an example control process for a smartcell battery system, in accordance with one or more embodiments described herein.

For example, FIG. 3 illustrates a high-level flow diagram of an example control process 300 for a smartcell battery system, in accordance with one or more embodiments described herein. With reference to FIGS. 1-3, in accordance with process 300, each of the battery cell units 106 A1-n, B1-n, and C1-n can communicate battery cell unit parameter information 302 to the master board 104. For example, over the course of operation of the vehicle 100 (e.g., including driving and charging operations, and in some implementations when the vehicle is not in an active operating mode), each of the battery cell units 106 A1-n, B1-n, and C1-n can be configured to provide the master board 104 with battery cell unit parameter information 302 comprising information identifying or indicating one or more parameters of the battery cell units. The battery cell unit parameter information 302 can include information regarding current conditions of the battery cell units 106 and/or respective battery cells 202 of the battery cell units, such as but not limited to: charge level, current/voltage input/output, current flow utilization, temperature and various other parameters as described in greater detail infra. The battery cell units 106 A1-n, B1-n, and C1-n can be configured to provide the battery cell unit parameter information 302 to the master board 104 in accordance with a defined frequency (e.g., every 1.0 millisecond, every 1.0 second, every 1.0 minute, every 5.0 minutes, etc.), in response to a trigger event (e.g., charge level dropping below a threshold or the like), and/or in response to a request received from the master board 104.

Figure 5:
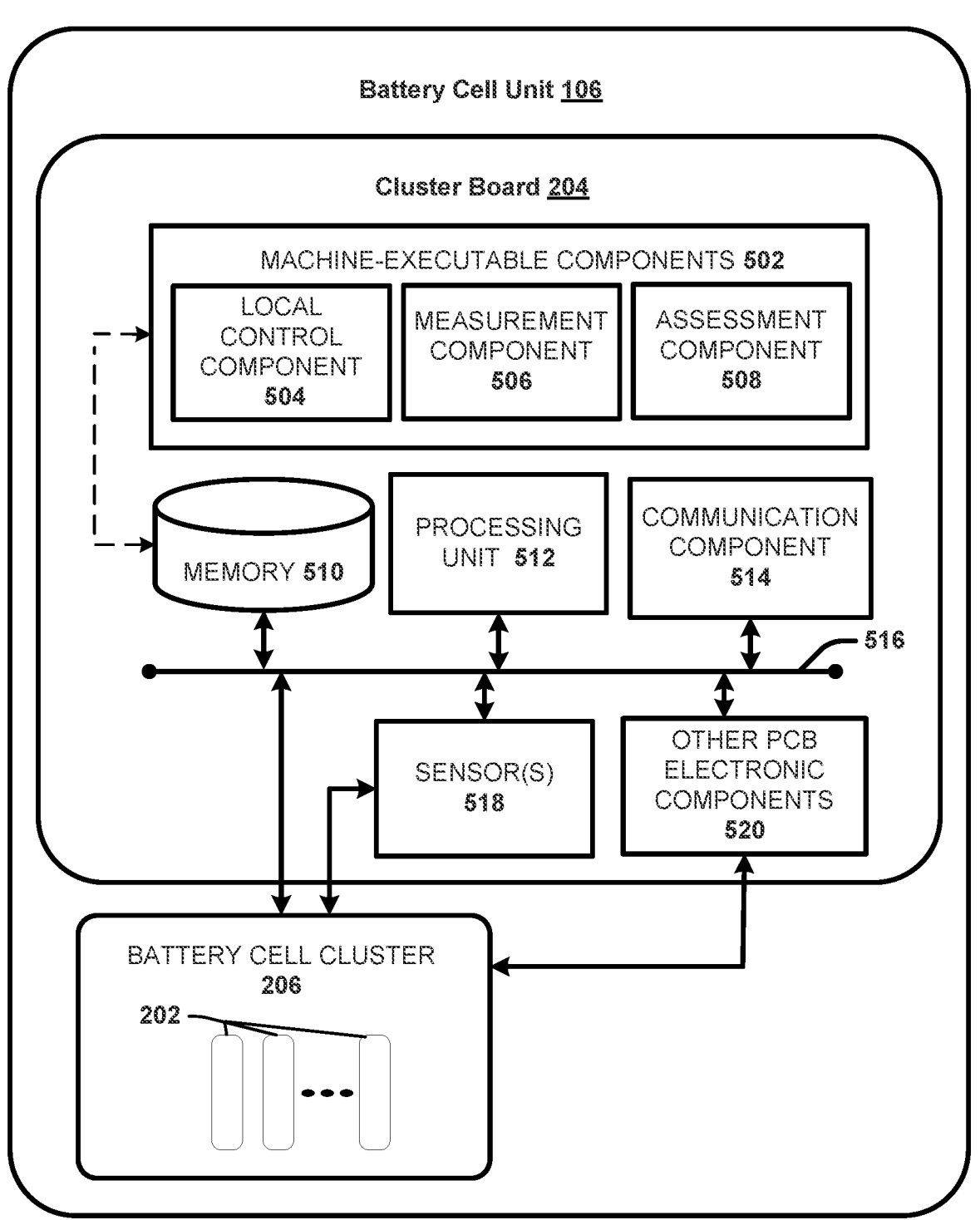
FIG. 5 illustrates a high-level block diagram of an example battery cell unit of a smartcell battery system, in accordance with one or more embodiments described herein.

The master board 104 can further monitor the current power demands 306 of the respective electrical systems of the vehicle 100, including the one or more LV electrical systems 108, the one or more HV electrical systems 110 and the one or more motors 112. Based on the current power demands 306 and the battery cell unit parameter information 302 for each of the battery cell units, the master board 104 can determine and communicate (e.g., transmit, broadcast, send, etc.) battery cell unit control information 304 to the respective battery cell units 106 A1-$n$, B1-$n$, and C1-$n$ that directs the respective battery cell units how to operate. At 308, the battery cell units 106 A1-$n$, B1-$n$, and C1-$n$ in turn can be configured to control power supply to the respective electrical systems of the vehicle 100 in accordance with the control information. In this regard, each of the battery cell units 106 A1-$n$. B1-$n$, and C1-$n$ can be configured to independently control (e.g., via local controllers, corresponding to local control component 504, as shown in FIG. 5) operations of respective battery cells 202 connected to the cluster boards 204 of the respective battery cell units and one or more of the electrical systems of the vehicle (e.g., one or more LV electrical systems 108, one or more HV electrical system 110 and/or one or more motors 112).

In this regard, the operations of the respective battery cells that are controlled by the local controllers based on the battery cell unit control information 304 can include, but are not limited to, the operating modes of the respective battery cells. For example, the battery cells 202 and/or a cluster 206 can be configured to operate in different operating modes, including an active mode wherein the battery cells 202 and/or cluster 206 are actively supplying power output to one or more electrical systems, and an inactive mode, wherein the battery cells 202 and/or cluster 206 are not supplying output power to the one or more electrical systems. In some embodiments, the different operating modes may include or correspond to a positive mode (e.g., corresponding to actively supplying output power to one or more electrical systems), a negative mode (e.g., corresponding to receiving power from the one or more electrical systems and/or an external charging circuit), and bypass mode (e.g., corresponding to an inactive mode wherein the battery cells do not receive or provide powers). To this end, the battery cell unit control information can 304 can control activation (i.e., turning on) and deactivation (i.e., turning off) of their respective battery cells 202 in association with supplying electrical current to the one or more electrical systems of the vehicle. In addition to merely controlling turning on and off power supply from the respective battery cells 202, each battery cell units 106 A1-$n$, B1-$n$, and C1-$n$ can be configured to control the amount of current supplied, the type of current supplied (e.g., DC or AC), and the direction of current flow, including output current flows from the battery cells to the one or more electrical systems, and input current flows to the battery cells 202 in association with charging operations, including input current flows received from an external charging system and/or the one or more electrical systems of the vehicle 100.

To this end, the battery cell unit control information 304 can include or correspond to scheduling information that directs the respective battery cell units 106 A1-$n$, B1-$n$, and C1-$n$ when and how to operate, including when to activate and deactivate supplying AC and/or DC power to the respective electrical systems of the vehicle 100, how much power (e.g., voltage level) to provide, and when to activate reverse current flows in association with charging operations. Because each of the battery cell units 106 A1-$n$, B1-$n$, and C1-$n$ can be independently controlled, the number of battery cell units 106 and/or the number of battery cells 202 being utilized to supply electrical power to the one electrical systems of the vehicle 100 can be tailored based on the power demands 306. In this regard, the master board 104 can selectively control utilization of the battery cell units 106 as needed to meet the power demands 306, including utilizing only a portion of the battery cell units 106 at any given time. In other words, the master board 104 can selectively control activating some of the battery cell units 106 and deactivating other ones of the battery cell units 106 over the course of operation of the vehicle as needed to meet the power demands 306.

In various embodiments, the control logic followed by the master board 104 to determine which battery cell units to activate and when can be based on balancing utilization of the respective battery cell units 106 in accordance with their respective states of charge (SOC). In this regard, the SOC of a battery cell 202 decreases the longer a battery cell unit is utilized and the greater the amount of output current supplied. Accordingly, the master board 104 can schedule utilization of the respective battery cell units 106 to supply DC and/or AC power to the one or more electrical systems based on their reported SOCs (e.g., included in the battery cell unit parameter information 302) in a manner that prioritizes utilization of those battery cell units 106 with higher SOCs.

In accordance with the disclosed techniques, in addition and/or alternative to the SOCs of the respective battery cell units, the master board 104 can further schedule utilization of the respective battery cell units 106 A1-$n$, B1-$n$, and C1-$n$ in a manner that regulates the temperatures of the respective battery cell units. In this regard, as discussed in the Background section, Li-Ion battery cells and other types of battery cells used in electric vehicles, such vehicle 100, are sensitive to temperature, which impacts performance of the battery pack including range, voltage efficiency, charge time, and the SOH the battery pack. Battery cells used in electric vehicles (e.g., battery cells 202) typically have a small thermal operating window in which they perform most efficiently. In addition, the battery cells can suffer from degradation during both active utilization and initiative utilization when exposed to temperatures that exceed certain levels (e.g., both high and low levels, such as greater than about 25° C. and lower than about 0° C.).

At a high level, the master board 104 can employ one or more control strategies for the smartcell battery system 102 that involve selectively using (e.g., turns on and off) the power supplied by respective battery cells 202 as needed based on the power demands of the electrical system to which they feed and monitored temperatures of the respective battery cells, (e.g., included in the battery cell unit parameter information 302), among other factors. In accordance with various embodiments, the master board 104 can increase and decrease battery cell usage priority such that each battery cell 202 and/or cluster 206 of cells can be warmed up or cooled without requiring any battery heating and cooling system actuation. This implies energy savings due to no actuation required from an external heating and cooling system to control maximum and/or minimum cell temperatures. In this regard, the traditional thermal control for battery packs requires energy to activate multiple actuators involved in cell cooling and heating events. In some embodiments in which an external cooling and heating system is incorporated into the smartcell battery system 102, the disclosed techniques also facilitate reducing energy consumption from the external thermal control system by delaying the need for activation thereof. Implicitly this functionality also manages the delta temperature within the battery pack cells, which for control purposes should be kept to a minimum value (e.g., ideal for cell ageing control and overall pack performance).

Furthermore, the battery cell usage scheduling logic employed by the master board 104 can incorporate functionality to not use battery cells or cell clusters 106 that are diagnosed faulty or unsafe. This can be based on temperature sensor electrical or rationality faults, voltage sensors faults, resistance measurements, current measurement faults, cell pressure measurements, contactor faults, communication faults or any other cluster control input faults.

Figure 4:
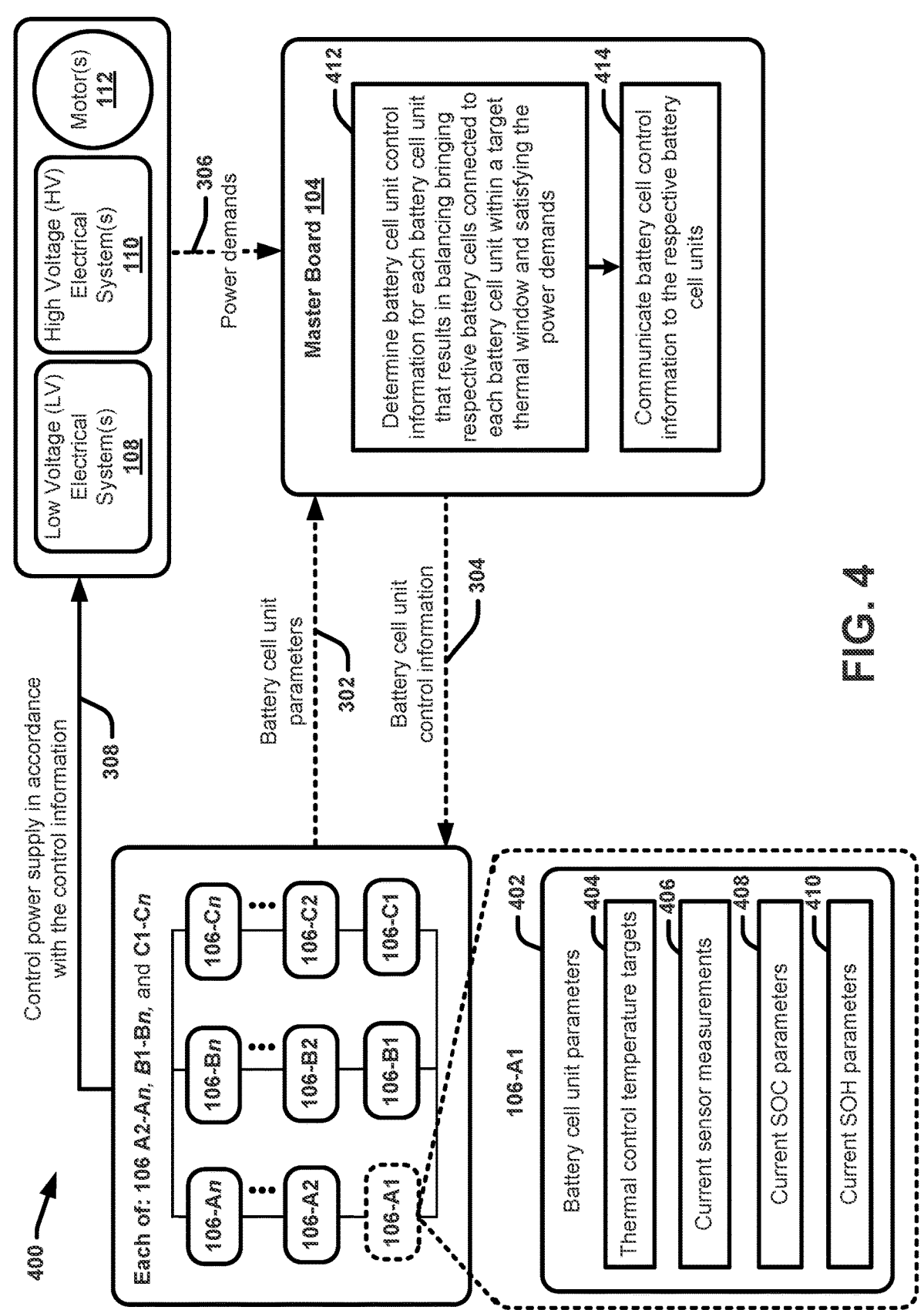
FIG. 4 illustrates another high-level flow diagram of an example control process for a smartcell battery system that incorporates thermal management, in accordance with one or more embodiments described herein.

For example, FIG. 4 illustrates a high-level flow diagram of an example control process 400 for a smartcell battery system that incorporates thermal management, in accordance with one or more embodiments described herein. Process 400 corresponds to process 300 with the addition of a high-level sub-process (e.g., corresponding to steps 412 and 414) performed by the master board 104 and a more detailed example of the battery cell unit parameters 402 that can be utilized to facilitate thermal management in accordance with one or more embodiments. Repetitive description of like elements employed in respective embodiments is omitted for sake of brevity.

In this regard, FIG. 4 presents some example battery cell unit parameters 402 that can be included in the battery cell unit parameter information 302 reported by each battery cell unit 106 A1-*n*, B1-*n*, and C1-*n*) to the master board 104. It should be appreciated that the battery cell unit parameter 402 are illustrated with respect to a single unit (i.e., battery cell unit 106-A1) for exemplary purposes. In various embodiments, the battery cell unit parameters 402 can include, but are not limited to, thermal control temperature targets 404, current sensor measurements 406, current SOC parameters 408 and current SOH parameters.

The thermal control temperature targets 404 can include information identifying or indicating one or more target thermal windows of the battery cells 202 (e.g., individually) and/or the cluster 206 of battery cells 206 of the battery cell unit. In this regard, the term "target thermal window" is used herein to refer to a desired or target temperate range for maintaining a battery cell 202 and/or cluster 206 of battery cells within and can be defined by an upper temperature threshold and a lower temperature threshold. In some embodiments, the median temperature of a target thermal window can include or correspond to the most optimal temperature for maintaining the battery cell 202 and/or the cluster 206. In some implementations, the battery cells 202 and/or the cluster 206 may be associated with different target thermal windows for different applications. For example, the battery cells 202 and/or the cluster 206 may have a first target thermal window defined by first upper and lower temperature thresholds in association with supplying DC power and a second target thermal window defined by second upper and lower temperature thresholds in association with supplying AC power or a combination of DC and AC power. In another example, the battery cells 202 and/or the cluster 206 may have a first target thermal window defined by first upper and lower temperature thresholds in association with supplying DC and/or AC power and a second target thermal window defined by second upper and lower temperature thresholds in association with receiving power during charging operations. In another example, the battery cells 202 and/or the cluster 206 may have a first target thermal window defined by first upper and lower temperature thresholds tailored to operations involving power supply below a threshold voltage level and a second operating window defined by second upper and lower temperature thresholds tailored to operations involving power supply above the threshold voltage level. The thermal control temperature targets 404 can also identify or indicate optimal upper and lower temperature levels for the battery cells 202 and/or the cluster 206 during inactive usage thereof (e.g., when the vehicle is turned off and/or when the battery cells 202 and/or the cluster 206 are otherwise not supplying or receiving power).

In some embodiments, the thermal control temperature targets 404 (i.e., the one or more target thermal windows) may be included in the battery cell unit parameters 302. As these targets are constant or relatively constant, in some implementations, the cluster boards 204 can be configured to communicate the thermal control temperature targets 402 to the master board 104 once (e.g., upon startup of the vehicle 100). In other embodiments, the master board 104 can store (e.g., in memory 618 or the like), information defining the thermal control temperature targets 404 (i.e., one or more target thermal windows) for each of the battery cell units 106 A1-*n*. B1-*n*, and C1-*n*. With these embodiments, the thermal control temperature targets 404 may be excluded from the battery cell parameters 302 sent to the master board 104.

The current sensor measurements 406 can include sensor measurements obtained by the cluster board 204 from one or more sensors (e.g., sensors 518) connected to the battery cells 202 and/or the cluster 206 and/or the cluster board 204. These sensors can include, but are not limited to, thermal sensors (i.e., temperature sensors), voltage sensors (e.g., voltage meters), pressure sensors, chemical sensors, and various others. In this regard, the current sensor measurements 406 can include, but is not limited to, information identifying or indicating, a current temperature of the battery cells 202, a current voltage output or input level of the battery cells 202, a current pressure level associated with the battery cells 202, a current cell material chemistry, and the like. In some embodiments, the cluster boards 204, the battery cells 202 and/or components thereof can include one or more sensors (e.g., included in sensors 518) configured to detect and report errors or faults associated with operations of the cluster boards 204 and/or the battery cells. For example, the errors and/or faults can be based on electrical connection issues (e.g., contact faults), electrical components failing or underperforming relative to a target, and various other defined error signals associated with the battery cells 202, the cluster board 204 and/or components thereof. With these embodiments, the current sensor measurements 406 can include any signals or measurements generated by such sensors.

The current SOC parameters 408 can include one or more parameters that identify or indicate the current SOC of the battery cells 202 (e.g., individually) and/or the cluster 206 (collectively). The state of charge of a battery describes the difference between a fully charged battery and the same battery in use. It is associated with the remaining quantity of electricity available in the cell. It is defined as the ratio of the remaining charge in the battery, divided by the maximum charge that can be delivered by the battery.

The current SOH parameters 410 can include information that identifies or indicates the state-of-health (SOH) of the battery cells 202 (e.g., individually) and/or the cluster 206 (collectively). In the domain of EVs, SOH is a figure of merit of the condition of a battery cell 202 or group of battery cells (e.g., a cluster 206 and/or all of the battery cells 202 included in the smartcell battery system 202), compared to its ideal conditions. For example, the unit of SOH can be represented as a percentage value (or another value), wherein a 100% SOH means that the battery's conditions match the battery's specifications. Typically, a battery's SOH will be 100% at the time of manufacture and will decrease over time and use. However, a battery's performance at the time of manufacture may not meet its specifications, in which case its initial SOH will be less than 100%. The main factors that contribute to battery degradation are driver patterns, driver aggression, climate, cabin thermal dynamics, and infrastructure, with driver patterns and climate being the most influential. As SOH does not correspond to a particular physical quality, there is no consensus in the industry on how SOH should be determined. In various embodiments, the SOH of an individual battery cell 202 and/or a cluster 206 can be determined based on one or more of the following parameters: internal resistance, internal impedance, internal conductance, capacity, voltage, self-discharge, ability to accept charge, number of charge/discharge cycles, battery age, thermal profile of the battery, and total energy charge and discharged. To this end, in some embodiments, the current SOH parameters 410 can include current values for one or more of these parameters and the master board 104 can be configured to calculate a current SOH for the battery cells 202 and/or cluster 206 associated with each of the battery cell units 106 A1-$n$, B1-$n$, and C1-$n$ based on current and historical measurements (e.g., tracked parameters over time) using a previously defined algorithm or process. In other embodiments, the cluster board 204 can perform the SOH assessment and report the current SOH value in the battery cell unit control information 304.

With reference to the master board 104, in various embodiments, the master board 104 can analyze and processes information included in the battery cell unit parameters 302 reported by the respective battery cell units 106 A1-$n$, B1-$n$, and C1-$n$ in association with determining the battery cell unit control information 304 using one or more optimization functions particularly tailored to accounting for the thermal sensitivities of the battery cells 202. In particular, at 412, the master board 104 can determine battery cell unit control information 304 for each of the battery cell units 106 A1-$n$, B1-$n$, and C1-$n$ that results in balancing bringing respective battery cells 202 connected to each of the battery cell units within a target thermal window and satisfying power demands of the one or more electrical systems. At 414, the master board 104 can further communicate the battery cell control information 304 to the respective battery cell units 106 A1-$n$, B1-$n$, and C1-$n$ in association with directing the battery cell units to control operations of the respective battery cells 202 and/or the cluster 206 connected thereto.

For example, in various embodiments, the battery cell unit control information 304 can include usage priority information that controls a priority order of usage of the respective battery cells controlled by each battery cell units 106 106 A1-$n$, B1-$n$, and C1-$n$ to supply the power to the one or more electrical systems of the vehicle 100 to which they are connected (e.g., one or more of the LV electrical systems 108, one or more of the HV electrical systems 110 and/or the one on more motors 112). In various embodiments, the priority order can prioritize using cooler battery cells before using warmer battery cells (e.g., in scenarios in which it is desired to increase the temperature of the cooler battery cells and/or decrease the temperature of the warmer ones). The priority order can further result in increasing or decreasing temperatures of different battery cells of the respective battery cells. For example, the operations comprise can comprise operating the respective battery cells in different operating modes, wherein the control information controls timing and duration of operating the respective battery cells in the different operating modes, and wherein the different operating modes result in increasing or decreasing temperatures of the respective battery cells.

For example, in some embodiments, at 412, the master board 104 can determine temperature changes required to bring the respective battery cells within the target thermal windows of the respective battery cell units 106 A1-$n$, B1-$n$, and C1-$n$. For instance, this can involve comparing the current temperatures of the respective battery cell units 106 to their corresponding thermal control windows for the current operating context of the respective battery cell units 106 (e.g., noting that the thermal control window can vary for different battery cell units and operating contexts, as described above) and determining whether and to what degree the temperatures of the respective battery cell units 106 should be increased or decreased to bring the temperatures of the respective battery cell units 106 within their target temperature window for the current operating context. With these embodiments, the master board 104 can determine the battery cell unit control information 304 based on the required temperature changes. For example, the master controller 104 can selectively determine how to schedule utilizing and not utilizing respective battery cell units 106 A1-$n$. B1-$n$, and C1-$n$ to provide power to the respective electrical systems of the vehicle 100 to meet the power demands while also achieving the temperature changes.

In this regard, the temperature of a battery cell 202 and/or cluster 206 increases as a function of the duration (e.g., time) of activation, the type of activation (e.g., supplying power or receiving power, generating AC power or DC power, etc.), and the amount of voltage or current involved in the activation. Likewise, the temperature of a battery cell 202 and/or cluster 206 can be decreased by deactivating the battery cell 202 and/or cluster 206 (e.g., turning off voltage output and/or input), operating the battery cell 202 and/or cluster 206 in bypass mode, and/or decreasing the amount of voltage utilized and/or the duration of utilization thereof. To this end, by incrementing cell usage priority or decreasing priority, each battery cell 202 or cluster 206 of cells can be warmed up or cooled down as needed to achieve the thermal control temperature targets without requiring any external battery heating/cooling system actuation. This implies energy savings due to no actuation required from the cooling system to control maximum and/or minimum cell temperatures. Implicitly this functionality also manages the delta temperature within the battery pack cells which should be kept to a minimum value (ideal for cell ageing control and overall pack performance). In this regard, the battery cell unit control information 304 can direct each battery cell unit 106 A1-$n$, B1-$n$, and C1-$n$ how to operate including whether and when (e.g., time-based, cluster priority based, etc.) to actively generate and supply AC and/or DC power, the amount of power (e.g., voltage output targets), the duration of power generation and supply, whether to deactivate generation and supply of power and so on. To this end, the battery cell unit control information 304 can define or correspond to a priority order for usage of the respective battery cell units 106 A1-$n$, B1-$n$, and C1-$n$.

In association with determining battery cell unit control information 304 that results in balancing achieving the thermal control temperature targets and satisfying the current power demands, the master board 104 can employ one or more optimization functions that implicitly account for known effects on changes to operating modes or states of the battery cells 202 and/or the clusters 206 on their temperatures. In various embodiments, the one or more optimization functions can also account for various additional parameters and constraints and complex relationships between these parameters and defined constraints (e.g., constraints related to satisfying the power demands, safety of operation of the vehicle 100 and others). For example, the additional parameters can include, but are not limited to, any of the parameters included in the battery cell unit control information 304. For instance, the one or more optimization functions can account for whether and to what degree the current SOC and/or SOH of a battery cell 202 and/or cluster 206 influences their temperature in association with operating in different operating modes and conditions. In another example, the one or more optimization functions can account for whether and to what degree the current battery cell pressure, material composition, and various other sensors values (e.g., included in the current sensor measurements 406) influence their temperature in association with operating in different operating modes and conditions.

In some embodiments, the additional parameters can also include historical tracked values of the battery cell unit parameters 402 for the respective battery units 106 A1-*n*, B1-*n*, and C1-*n* (e.g., as logged by the master board 104 over time). In some embodiments, the additional parameters can also include forecasted information, including forecasted power demands (e.g., corresponding to the power demands 306 yet as anticipated within one or more upcoming timeframes), and forecasted values for any of the battery cell unit parameters 402. In various embodiments, the master board 104 can employ machine learning (ML) and/or artificial intelligence (AI) techniques to determine these forecasted values based on the historical tracked values and historical patterns associated with the power demands 306 as also tracked and logged over time. In some embodiments, the additional parameters can also include external factors, such as known or forecasted weather information (e.g., current and forecasted climate temperatures and weather patterns), which can significantly impact the temperatures of the battery cells 202 and/or the clusters 206. The temperatures of the respective battery cells 202 and/or the clusters can also be influenced by their relative position to one another and their position as installed within the vehicle 100, which can also be accounted for in the one or more optimization functions as constraints or the like. For example, an inactive battery cell cluster can be indirectly heated by an active battery cell cluster positioned nearby. Accordingly, the optimization function can account for the relative positions of battery cell units to one another when scheduling the respective battery cell clusters in manner directed to increase or decrease their current temperatures to achieve the thermal control targets 412.

In addition, as noted above, in some embodiments, the battery cell unit scheduling logic employ by the master board 104 can incorporate functionality to not use cells or clusters that are diagnosed faulty or unsafe. With these embodiments, the master board 104 can perform a diagnosis function (e.g., via diagnostics component 608) for the respective battery cell units 106 A1-*n*. B1-*n*, and C1-*n* based on analysis of information included in the battery cell parameters 302. For example, the master board 104 can determine or infer (e.g., using machine learning component 614) whether a battery cell unit is faulty or unsafe based on temperature sensor electrical or rationality faults, voltage sensors faults, resistance measurements, current measurement faults, cell pressure measurements, contactor faults, communication faults or any other cluster control input faults.

FIG. 5 illustrates a high-level block diagram of an example battery cell unit 106 of the smartcell battery system 102, in accordance with one or more embodiments described herein. With reference to FIGS. 1-5, the battery cell unit 106 can include or correspond to some or all of the battery cell units 106 A1-*n*, B1-*n*, and C1-*n*. Repetitive description of like elements employed in respective embodiments is omitted for sake of brevity.

As illustrated in FIG. 5, the cluster board 204 can include a memory 510 that can store computer or machine-executable components 502, including local control component 504, measurement component 506 and assessment component 508. In various embodiment, the local control component 504 can include or correspond to one or more local control units of the cluster board that can perform control functions of the cluster board 204, including interpreting and applying or executing control commands in accordance with the battery cell unit parameter information 302 directed to the particular battery cell unit 106 from the master board 104. For example, the control component 504 can control operating modes of respective battery cells 202 connected to the cluster board 204 and voltage output amounts via controlling switching of respective power switches (e.g., MOSFETs, FETs, etc.) and electrical circuits (e.g., the DCDC converter circuit and the H-bridge, among others) of the cluster board 204 that connect the battery cell 202 to DC and AC input and output electrical connections connected to one or more of the electrical systems of the vehicle 100. The local control component 504 can also control wireless communication between the cluster board 204 and the master board 104 (e.g., via communication component 514) in accordance with a defined communication protocol. For example, the local controller 504 can control timing of transmission of the battery cell unit parameters 302 for the battery cell unit 106. The measurement component 506 can control measuring and collecting any current sensor measurements 406 from one or more sensors 518 connected to the cluster board 204. As noted above, these sensors can include various types of sensors (e.g., temperature sensors, pressure sensors, chemical sensors, motion sensors, etc.) coupled to the battery cell cluster 206, individual battery cells 202 and/or the electrical hardware components of the cluster board 204. The assessment component 508 can perform intelligent processing function for the cluster board 204. For example, in some embodiments, the assessment component 508 can perform same or similar processing functions described with respect to the master board 104, yet locally, in association with performing control functions autonomously in between reception of control information from the master board 104.

The cluster board 204 can further include a processing unit 512 that executes the machine-executable components 502 stored in memory 510. The master board 104 can further include a communication component 514 that enables wireless communication between the cluster board 204 and the master board 104. In this regard, communication component 514 (and communication component 622) can include or correspond to suitable hardware and/or software that enables wireless communication between the cluster board 204 and the master board 104, and optionally other external systems and/or devices. For example, communication component 514 can comprise a transmitter, a receiver, and/or a transceiver. The communication component 514 can employ any suitable proprietary and/or non-propriety wireless communication protocols, which can comprise virtually any desired wired or wireless technology, including but not limited to: powerline ethernet, wireless fidelity (Wi-Fi), BLU-ETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIG-BEE®, RF4CE protocol, WirelessHART protocol, 6LoW-PAN (IPv6 over Low power Wireless Area Networks), Z-Wave, an ANT, an ultra-wideband (UWB) standard protocol, and/or other proprietary and non-proprietary communication protocols. In such an example and as described above, the communication component 514 can include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between cluster board 204 and the master board 104.

The other PCB electronic components 520 can include or correspond to the various electrical components of the cluster board that enable the functionality of the cluster board 204 as applied to the smartcell battery system. For example, as noted above, the other PCB electronic components 520 can include but are not limited to, a DCDC converter, a power module comprising a number of power switches used for the DCDC converter and the H-bridge (among other functions), busbars, wires, ports, and various others. The cluster board 204 can further include a system bus 516 that communicatively and/or operatively connects the various hardware and software components of the cluster board 204 to one another and the battery cell cluster 206.

Figure 6:
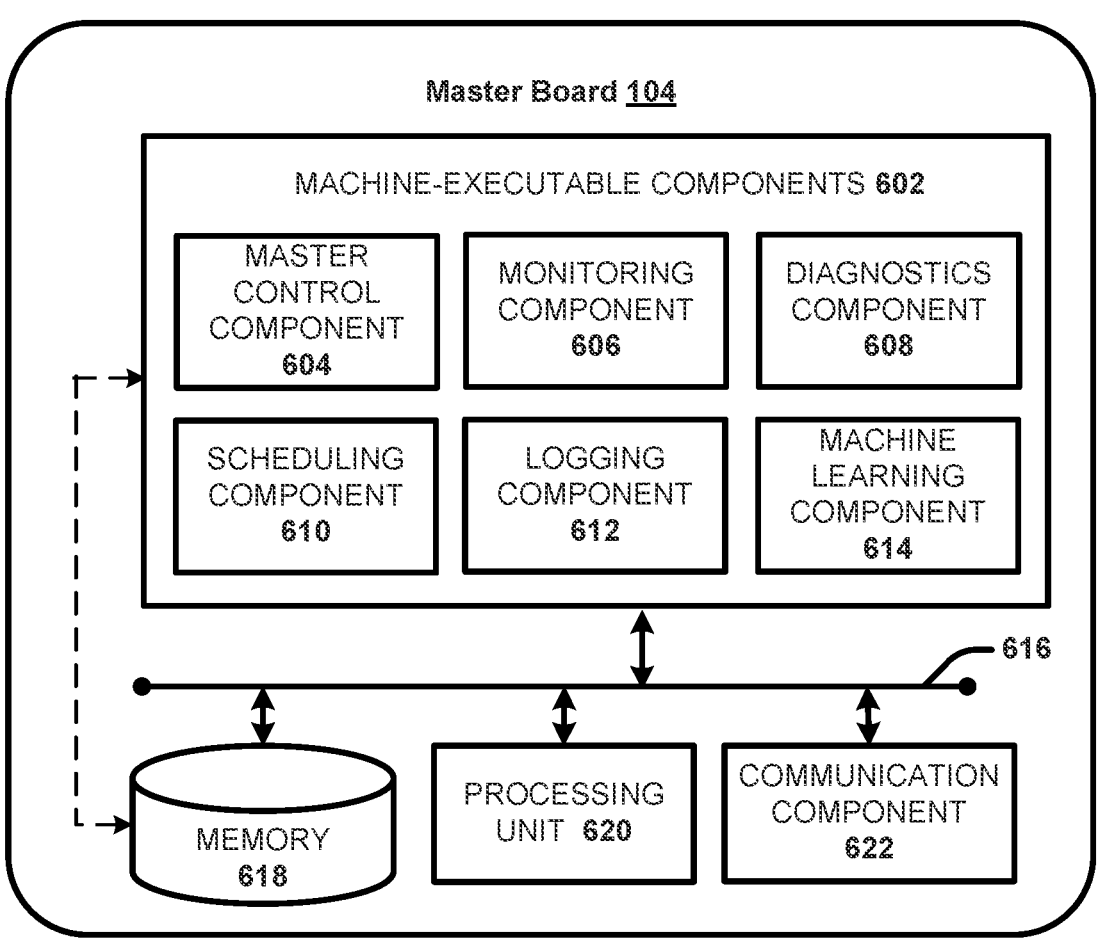
FIG. 6 illustrates a high-level block diagram of an example master board in accordance with one or more embodiments described herein.

FIG. 6 illustrates a high-level block diagram of an example master board 104 in accordance with one or more embodiments described herein. The master board 106 can include a memory 618 that can store computer or machine-executable components 602, including master control component 604, monitoring component 606, diagnostics component 608, scheduling component 610, logging component 612 and machine learning component 614. The master board 106 can further include a processing unit 620 that executes the machine-executable components 602 stored in memory 618. The master board 104 can further include a communication component 622 that enables wireless communication between the master board 104 and the cluster boards 204 of the respective battery cell units 106 A1-*n*, B1-*n*, and C1-*n*. For example, communication component 622 can correspond to communication component 514, and thus repetitive description is omitted for sake of brevity. The master board 104 can further include a system bus 616 that couples memory, processing unit 620 and communication component 622 to one another.

With reference to FIGS. 1-6, the master control component 604 can include or correspond to the main controller of the smartcell battery system 102. In this regard, the master controller can perform the high-level control functions, including sending out (e.g., broadcasting, transmitting, etc.) the battery cell unit control information 304 to the battery cell units 106 A1-*n*, B1-*n*, and C1-*n* (e.g., using communication component 622) in association directing the local control components 504 thereof to control operations of the respective battery cells 202 and/or clusters 206 connected thereto. The master control component 604 can also control sending requests for provision of battery cell unit parameter information 302 to the master board 104 as needed, in some embodiments. The monitoring component 606 can monitor the battery cell unit parameter information 302 received from the battery respective battery cell units 106 A1-*n*, B1-*n*, and C1-*n* as well as the power demands 306 of the electrical systems of the vehicle 306. In some embodiments, in association monitoring the battery cell unit parameter information 302 and the power demands 306, the monitoring component 606 can initiate downstream processing functions based on detected changes in the information and/or parameters values in the information corresponding to a trigger condition (e.g., an increase or decrease in temperature beyond a threshold, failure to receive a particular parameter value, indicating a potential fault or error associated with a battery cell unit, etc.) for downstream processing (e.g., via the diagnostics component 608, the scheduling component 610, the logging component 612 and/or the machine learning component 614). In some embodiments, the logging component 612 can log (e.g., record and track in one or more log files/records or the like stored in memory 618) some or all of the battery cell unit parameters 302 and information describing the power demands 306 over time.

The diagnostics component 608 can perform a diagnosis function for the respective battery cell units 106 A1-*n*, B1-*n*, and C1 based on analysis of information included in the battery cell parameters 302. For example, the diagnostics component 608 can employ one or more diagnosis models (e.g., algorithms, machine learning models, classification models, etc.) configured to determine or infer whether a battery cell unit 106 A1-*n*, B1-*n*, and C1 is faulty or unsafe based on temperature sensor electrical or rationality faults, voltage sensors faults, resistance measurements, current measurement faults, cell pressure measurements, contactor faults, communication faults or any other cluster control input faults. In some embodiments, based on a determination that a battery cell unit is faulty or unsafe (for any number of reasons), the scheduling component 610 can be configured to retire (i.e., not use or schedule utilization thereof) or temporary retire utilization of the battery cell unit until the unit has been repaired or replaced. In this regard, the scheduling component 610 can "retire" a battery cell unit by directing the battery cell unit to deactivate usage of the battery cells 202 in association with supplying and/or receiving power.

The scheduling component 610 can determine the battery cell unit control information 304 in accordance with the techniques described with reference to FIGS. 3 and 4. In this regard, the scheduling component 610 can determine battery cell unit control information 304 for each of the battery cell units that results in balancing bringing the respective battery cells connected thereto within a target thermal window and satisfying power demands 304 of the one or more electrical systems of the vehicle to which they are connected (e.g., the one or more LV electrical systems 108, the one or more HV electrical systems 110 and/or the one or more motors 112). As described above, in various embodiments, the scheduling component 610 can determine control information that comprises usage priority information that controls a priority order of usage of the respective battery cells to supply the power to the one or more electrical systems. For example, the scheduling component 610 can determine the priority order as a function of prioritizing usage of cooler battery cells before using warmer ones. In another example, the scheduling component 610 can determine the priority order in a manner that results in increasing or decreasing temperatures of different battery cells as needed to bring them within their target thermal windows. For example, the scheduling component 610 can determine temperature changes required to achieve a thermal control temperature window for the battery cells (e.g., as described with reference to 412) and determine battery cell control information 304 for each battery cell unit 106 A1-*n*, B1-*n*, and C1 that results in balancing achieving the thermal control temperature window and satisfying the current power demands. To facilitate this end, the scheduling component 610 can employ the thermal control temperature windows (e.g., maximum and minimum temperature values for one or more operating contexts) for each of the battery cell units (e.g., included in the battery cell unit parameters 302 and/or previously received or defined by the master board 104 and stored in memory 618), the received battery control cell unit parameter information 302, the monitored power demands 306 and one or more optimization functions, as described above with reference to FIG. 4. In some embodiments, the one or more optimization functions can also process various additional inputs (e.g., historical information, climate information, forecasted information, etc.) in addition to the battery cell unit parameters 302 recently received from the respective battery cell units 106.

In various embodiments, the scheduling component 610 can employ machine learning component 614 in association with determining battery cell unit control information that results in balancing achieving the thermal control temperature targets of the battery cell unit 106 A1-*n*, B1-*n*, and C1 and satisfying the current power demands 306 (and forecasted power demands). To this end, machine learning component 614 employ one or more machine learning (ML) and/or artificial intelligence (AI) models to learn, for instance, relationships (e.g., cause and/or effect) between operating modes/conditions of the respective battery cell units, temperatures of the battery cells 202 and/or clusters 206, the power demands 306 and various other parameters (e.g., any of the parameters included in the battery cell control information 304, external climate parameters, forecasted parameters, and constraints on the optimization function). In these embodiments, based on learning such relationships, the scheduling component 610 can employ the one or more ML and/or AI models to perform one or more tasks including, but not limited to, determining or inferring the battery cell unit control information 304, making a prediction, making an estimation (e.g., cell capacity (e.g., electric energy) of active cell material), classifying data, implementing one or more monitoring and/or control operations, and/or another task. In some embodiments, such a machine learning model can comprise a machine learning model based on artificial intelligence (AI) including, but not limited to, a shallow or deep neural network model, a support vector machine (SVM) model, a classifier, a decision tree classifier, a regression model, and/or any supervised or unsupervised machine learning model that can perform the operations of the machine learning component described above.

FIG. 7 illustrates an example, computer-implemented method 700 for controlling usage of battery cells of a smartcell battery system based on thermal considerations, in accordance with one or more embodiments described herein. At 702, method 700 comprises, employing, by a system operatively coupled to at least one processor (e.g., electric vehicle 100, master board 104, or the like), a smartcell battery system (e.g., smartcell battery system 102) to supply power to one or more electrical systems of an electric vehicle, the smart cell battery system comprising a plurality of battery cell units respectively comprising local controllers (e.g., local control component 504) that control operations of respective battery cells connected to the local controllers. At 704, method 700 comprises determining, by the system (e.g., via master board 104 and/or scheduling component 610), control information for each of the battery cell units that results in balancing bringing the respective battery cells within a target thermal window and satisfying power demands of the one or more electrical systems. At 706, method 700 comprises directing, by the system (e.g., via master control component 604) the local controllers to control the operations of the respective battery cells in accordance with the control information.

FIG. 8 illustrates another example, computer-implemented method 800 for controlling usage of battery cells of a smartcell battery system based on thermal considerations, in accordance with one or more embodiments described herein. At 802, method 800 comprises, determining, by a system operatively coupled to at least one processor (e.g., electric vehicle 100, master board 104, or the like), temperature changes required to bring battery cells of a smartcell battery system (e.g., smartcell battery system 102) within a target thermal window, wherein the smartcell battery system comprises a plurality of battery cell units respectively comprising local controllers (e.g., cluster board 204, and/or local control component 504) that control operations of respective clusters (e.g., clusters 206) of the battery cells connected to the local controllers. At 804, method 800 comprises determining, by the system, control information for each of the battery cell units that results in balancing achieving the temperature changes and satisfying power demands of the one or more electrical systems to which the battery cells are configured to supply power (e.g., one or more electrical systems of an electric vehicle 100 and/or another electrical machine, system, or device). At 806, method 800 comprises directing, by the system (e.g., via master control component 604) the local controllers to control the operations of the respective battery cells in accordance with the control information.

FIG. 9 illustrates another example, computer-implemented method 900 for controlling usage of battery cells of a smartcell battery system based on thermal considerations, in accordance with one or more embodiments described herein Method 900 comprises, at 902, reporting, by local controllers of respective battery cell units of a smartcell battery system, battery cell unit parameter information to a master controller of the smartcell battery system, the local controllers (e.g., cluster boards 204 and/or local control component 504) and the master controller (e.g., master board 104 and/or master control component 604) respectively coupled to processors (e.g., processing unit 512 and processing unit 620), and the battery cell unit parameters comprising temperatures of respective battery cells connected to the local controllers. At 904, method 900 comprises receiving, by the local controllers from the master controller, control information, determined by the master controller based on the battery cell unit parameter information, that results in balancing bringing the respective battery cells withing a target thermal window and satisfying power demands of the one or more electrical systems. At 906, method 900 further comprises controlling, by the local controllers, operations of the respective battery cells in accordance with the control information. (e.g., controlling usage of the battery cells to supply AC power and/or DC power, controlling timing and amount (e.g., voltage amount)

of the supplied power, controlling usage of the battery cells to receive power in association charging, controlling, controlling timing of activation and deactivation of the battery cells, etc.).

The one or more flowcharts and/or block diagrams in the figures illustrate the architecture, functionality, and operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks. As it is employed in the subject specification, the term "processor" or "processing unit" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. A processor can employ distributed and/or federated machine intelligence, which can be employed to operate and/or facilitate one or more of the aforementioned computer-readable program instructions.

Memory and/or memory components described herein can be either volatile memory or nonvolatile memory, and/or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling. As referenced herein, an "entity" can comprise a machine, device, hardware, software, computing device and/or human. Such entity can facilitate implementation of the subject matter disclosed herein in accordance with one or more embodiments described herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is it meant to preclude equivalent exemplary structures and/or techniques known to those of ordinary skill in the art.

The description of the one or more various embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the embodiments disclosed herein.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

employing, by a system operatively coupled to at least one processor, a smartcell battery system to supply power to one or more electrical systems of an electric vehicle, the smartcell battery system comprising a plurality of battery cell units respectively comprising local controllers that control operations of respective battery cells connected to the local controllers;

determining, by the system, based on respective current operating contexts of the battery cell units, respective target temperature windows for the battery cell units; and controlling, by the system, via transmissions of respective control information to the battery cell units, respective operations of the battery cells of the battery cell units to bring respective temperatures of the battery cells within the respective target temperature windows of the corresponding battery cell units and satisfy power demands of the one or more electrical systems, and while maintaining a temperature delta of the respective temperatures of the battery cells in the smartcell battery system that satisfies a defined criterion.

2. The method of claim 1, further comprising:

determining, by the system, respective temperature changes required to bring the battery cells within the respective thermal target windows; and determining, by the system, the respective control information comprises based on the respective temperature changes.

3. The method of claim 1, wherein the respective current operating contexts of the battery cell units comprise the smartcell battery system being connected to a charging system external to the electric vehicle, and wherein the determining the respective target temperature windows for the battery cell units comprises determining the respective target temperature windows based on at least one of a type of voltage supplied by the charging system or a voltage level of the voltage supplied by the charging system.

4. The method of claim 1, wherein the respective current operating contexts of the battery cell units comprise at least one of a type of voltage being employed to supply the power to the one or more electrical systems or a voltage level being employed to supply the power to the one or more electrical systems, and wherein the determining the respective target temperature windows for the battery cell units comprises determining the respective target temperature windows based on at least one of the type of voltage being employed to supply the power to the one or more electrical systems or the voltage level being employed to supply the power to the one or more electrical systems.

5. The method of claim 1, and wherein the respective current operating contexts of the battery cell units comprise respective operating modes of the battery cells, wherein the operating modes comprise active mode, inactive mode, positive more, negative mode, and bypass mode, wherein the determining the respective target temperature windows for the battery cell units comprises determining respective target temperature windows for the battery cells based on the respective operating modes of the battery cells.

6. The method of claim 5, wherein the control information controls timing and duration of operating the battery cells in the operating modes based on the respective target temperature windows for the battery cells.

7. The method of claim 1, further comprising:

receiving, by the system, battery cell unit parameter information from the local controllers comprising one or more current parameters associated with the respective battery cells, the one or more current parameters comprising current temperatures of the respective battery cells; and determining, by the system, the respective control information comprise determining the control information based on the battery cell unit parameter information.

8. The method of claim 1, further comprising:
determining, by the system, the respective control information based on states of charge and states of health of the respective battery cells.

9. The method of claim 1, further comprising:
determining, by the system, the respective control information based on diagnostic information associated with the battery cell units, wherein the diagnostic information indicates whether respective ones of the battery cell units received a diagnosis of being faulty or unsafe.

10. The method of claim 9, wherein the respective control information directs any of the battery cell units that received the diagnosis of being faulty or unsafe to operate respective ones of their battery cells in an inactive operating mode.

11. A system, comprising:
a smartcell battery system configured to supply power to one or more electrical systems of an electric vehicle, the smartcell battery system comprising a plurality of battery cell units respectively comprising local controllers that control operations of respective battery cells connected to the local controllers;
a memory that stores computer-executable components; and
a processor that executes at least one of the computer-executable components that:
determines, based on respective current operating contexts of the battery cell units, respective target temperature windows for the battery cell units; and
controlling, via transmissions of respective control information to the battery cell units, respective operations of the battery cells of the battery cell units to bring respective temperatures of the battery cells within the respective target temperature windows of the corresponding battery cell units and satisfy power demands of the one or more electrical systems, and while maintaining a temperature delta of the respective temperatures of the battery cells in the smartcell battery system that satisfies a defined criterion.

12. The system of claim 11, wherein the at least one of the computer-executable components further:
determines respective temperature changes required to bring the battery cells within the respective thermal target windows; and
determines the respective control information based on the temperature changes.

13. The system of claim 11, wherein the respective current operating contexts of the battery cell units comprise the smartcell battery system being connected to a charging system external to the electric vehicle, and wherein the determining the respective target temperature windows for the battery cell units comprises determining the respective target temperature windows based on at least one of a type of voltage supplied by the charging system or a voltage level of the voltage supplied by the charging system.

14. The system of claim 11, wherein the respective current operating contexts of the battery cell units comprise at least one of a type of voltage being employed to supply the power to the one or more electrical systems or a voltage level being employed to supply the power to the one or more electrical systems, and wherein the determining the respective target temperature windows for the battery cell units comprises determining the respective target temperature windows based on at least one of the type of voltage being employed to supply the power to the one or more electrical systems or the voltage level being employed to supply the power to the one or more electrical systems.

15. The system of claim 11, wherein the respective current operating contexts of the battery cell units comprise respective operating modes of the battery cells, wherein the operating modes comprise active mode, inactive mode, positive more, negative mode, and bypass mode, wherein the determining the respective target temperature windows for the battery cell units comprises determining respective target temperature windows for the battery cells based on the respective operating modes of the battery cells.

16. The system of claim 11, wherein the at least one of the computer-executable components further:
receives battery cell unit parameter information from the local controllers comprising one or more current parameters associated with the respective battery cells, the one or more current parameters comprising current temperatures of the respective battery cells; and
determines the respective control information based on the battery cell unit parameter information.

17. The system of claim 16, wherein the battery cell unit parameter information further comprises states of charge and states of health of the respective battery cells.

18. A non-transitory computer-readable medium having instructions stored thereon to facilitate controlling power supplied to one or more electrical systems of an electric vehicle from a smartcell battery system comprising a plurality of battery cell units respectively comprising local controllers that control operations of respective battery cells connected to the local controllers, wherein the instructions, when executed by a processor, facilitate performance of operations, comprising:
determining, based on respective current operating contexts of the battery cell units, respective target temperature windows for the battery cell units; and
controlling, via transmissions of respective control information to the battery cell units, respective operations of the battery cells of the battery cell units to bring respective temperatures of the battery cells within the respective target temperature windows of the corresponding battery cell units and satisfy power demands of the one or more electrical systems, and while maintaining a temperature delta of the respective temperatures of the battery cells in the smartcell battery system that satisfies a defined criterion.

19. The non-transitory computer-readable medium of claim 18, wherein the operations further comprise:
determining respective temperature changes required to bring the battery cells within the respective thermal target windows; and
determining the respective control information based on the respective temperature changes.

20. The non-transitory computer-readable medium of claim 18, wherein the respective current operating contexts of the battery cell units comprise the smartcell battery system being connected to a charging system external to the electric vehicle, and wherein the determining the respective target temperature windows for the battery cell units comprises determining the respective target temperature windows based on at least one of a type of voltage supplied by the charging system or a voltage level of the voltage supplied by the charging system.

* * * * *